United States Patent
Schamel et al.

(10) Patent No.: US 6,177,010 B1
(45) Date of Patent: Jan. 23, 2001

(54) INTERNAL FILTER FOR FLUID LINES

(75) Inventors: Andreas Schamel, Bonn (DE); Thomas McCarthy, Dearborn, MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/333,424

(22) Filed: Jun. 15, 1999

(30) Foreign Application Priority Data

Jun. 16, 1998 (GB) ................................................. 98110948

(51) Int. Cl.⁷ ..................................................... B01D 25/12
(52) U.S. Cl. .......................... 210/232; 210/130; 210/446; 210/447; 210/450; 210/497.01
(58) Field of Search ................................... 210/232, 130, 210/447, 446, 450, 497.01

(56) References Cited

U.S. PATENT DOCUMENTS

| | | |
|---|---|---|
| 2,793,752 * | 5/1957 | Jay . |
| 3,109,809 * | 11/1963 | Verrando, Jr. . |
| 3,422,956 * | 1/1969 | Hadden . |
| 3,993,561 * | 11/1976 | Swearingen . |
| 4,169,795 * | 10/1979 | Raines . |
| 4,400,277 * | 8/1983 | Leason . |

FOREIGN PATENT DOCUMENTS

3718068C1   6/1988   (DE) .

* cited by examiner

*Primary Examiner*—Thomas M. Lithgow
(74) *Attorney, Agent, or Firm*—Jerome R. Drouillard

(57) ABSTRACT

A rod-shaped pipe filter for fluid lines having a fine-mesh pipe filter element, flowed through from inside to outside and providing a bypass function when the filter element is clogged, the fine-mesh pipe filter element, inserted by its inlet end into the fluid line in a known, sealed way, is arranged at a distance from the wall of the fluid line, is kept at a distance from the wall of the fluid line by means of reinforcing ribs with lug-shaped spacers, bears with its outlet end via a tapered surface against an offset of the fluid line and has here bypass openings which ensure a fluid overflow from the inner region to the outer region and to the branch to the unit to be supplied with fluid, even when the filter element is clogged.

7 Claims, 1 Drawing Sheet

INTERNAL FILTER FOR FLUID LINES

FIELD OF THE INVENTION

The invention relates to a rod-shaped pipe filter for fluid lines, in particular in internal combustion engines having a fine-mesh pipe filter element, flowed through from inside to outside and providing a bypass function when the filter element is clogged.

DISCUSSION OF THE PRIOR ART

DE 37 18 068 C1 discloses a rod-shaped pipe filter for fluid lines, in particular in internal combustion engines, in which filter a fine-mesh pipe filter element, flowed through from inside to outside, provides a bypass function when the filter element is clogged.

BACKGROUND OF THE INVENTION

The known rod-shaped pipe filter for fluid lines, in particular in internal combustion engines, is provided here with a bypass pipe, extending within the pipe filter element and having a valve which opens in the flow direction, counter to a spring force, and is level with the flow inlet of the pipe filter element.

The known rod-shaped pipe filter for fluid lines, in particular in internal combustion engines, has the disadvantage that the structural complexity is increased by the bypass pipe and the valve.

The object of the invention is to improve a rod-shaped pipe filter for fluid lines, in particular in internal combustion engines, in such a way that, while keeping the filter structurally simple, the desired bypass function is nevertheless provided when the filter element is clogged—under normal conditions, however, produces 100% filtering (i.e. the bypass volumetric flow in normal operation of the filter is kept equal to zero).

This object is achieved according to the invention by the features presented in the defining part of the patent claim being provided in the case of a rod-shaped pipe filter for fluid lines, in particular in internal combustion engines, [of the type explained in the preamble of the patent claim] having a fine-mesh pipe filter element, flowed through from inside to outside and providing a bypass function when the filter element is clogged.

The fact that the fine-mesh pipe filter element, inserted by its inlet end into the fluid line in a known, sealed way, is arranged at a distance from the wall of the fluid line and is kept with its outlet end at a distance from the wall of the fluid line by means of spacers, and has here bypass openings which lead from the inner region of the pipe filter element to the outer region, and the fact that the branch for the device to be supplied with the filtered fluid branches off from the outer region at a considerable distance upstream of the outlet end have the effect of providing a rod-shaped pipe filter for fluid lines, in particular in internal combustion engines, which provides the desired and required bypass function when, in rare cases of a malfunction, the filter element is clogged, without the structural complexity of a bypass pipe or a valve.

BRIEF DESCRIPTION OF THE DRAWINGS

The invention is explained in more detail on the basis of an illustrative embodiment shown in the attached drawings, in which.

DETAILED DESCRIPTION OF THE PREFERRED EMBODIMENTS

Figure 1:
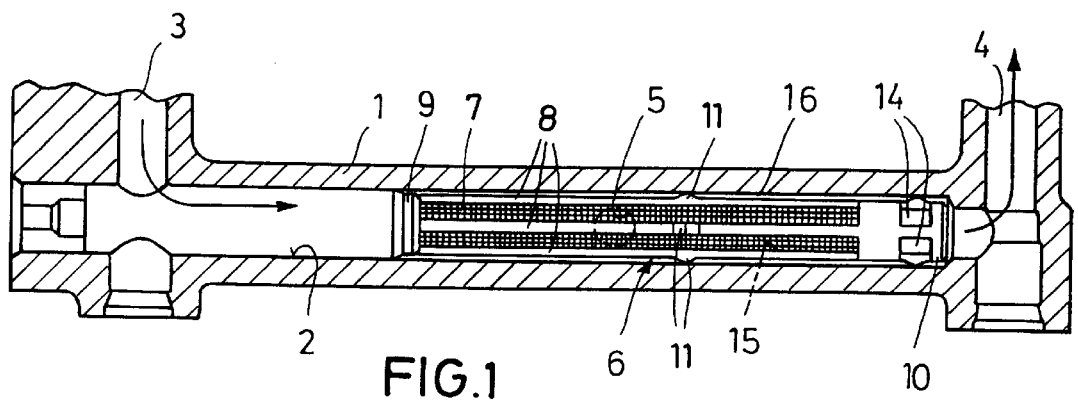
FIG. 1 shows a partial section through a fluid line in an internal combustion engine, with an inserted rod-shaped pipe filter according to the invention, in side view.

Shown in section in FIG. 1 is a part 1 of an internal combustion engine in which there is formed a fluid line 2, which serves for the distribution of a fluid, such as the lubricating oil of the internal combustion engine for example, and which is supplied with the fluid from an inlet side, arrow 3, to an outlet side, arrow 4.

In the region of the fluid line 2 there is provided a branch 5 for a unit of the internal combustion engine which has to be supplied with particularly finely filtered fluid or lubricating oil of the internal combustion engine.

Figure 2:
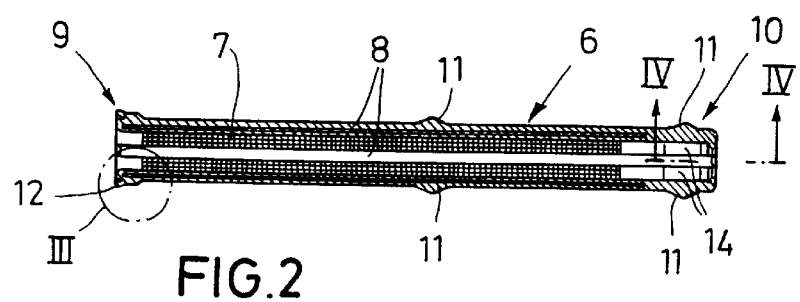
FIG. 2 shows a section through a rod-shaped pipe filter according to the invention.
Figure 3:
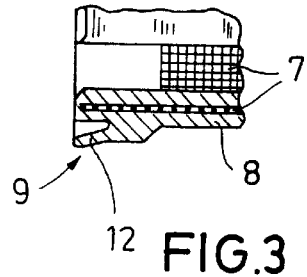
FIG. 3 shows an enlarged representation of the inlet end in the circle III in FIG. 2.
Figure 4:
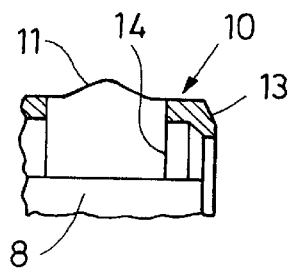
FIG. 4 shows an enlarged representation of the outlet end in the section IV—IV in FIG. 2.

According to the invention, a rod-shaped pipe filter 6 according to the invention, the structural design of which is explained in more detail in conjunction with FIGS. 2 to 4, is arranged in the fluid line 2.

The rod-shaped pipe filter 6 substantially comprises a fine-mesh pipe filter element 7, which is encapsulated by plastic material, which forms reinforcing ribs 8, an inlet end 9 and an outlet end 10. The reinforcing ribs 8 are provided with lug-like spacers 11, which keep the fine-mesh pipe filter element 7 at a distance from the wall of the fluid line 2.

The inlet end 9 of the rod-shaped pipe filter 6 is provided with a peripheral sealing lip 12, by which it is sealed off with respect to the wall of the fluid line 2.

The outlet end 10 of the rod-shaped pipe filter 6 is provided with a tapered surface 13, by which it bears against an offset end of the fluid line 2 and has, in addition, bypass openings 14, which establish a connection from the inner space 15 of the rod-shaped pipe filter 6 to the outer space 16 (see FIG. 1).

The mode of operation of the rod-shaped pipe filter 6 according to the invention is now explained below.

Under normal operating conditions, for example at a lubricating oil temperature of between −20° C. and +150° C., the main flow of the lubricating oil takes place through the inner space 15 of the rod-shaped pipe filter 6 and, when the fine-mesh pipe filter element 7 is not clogged, an adequate amount of lubricating oil passes exclusively through the filter fabric, so that the unit connected to the branch 5 is supplied reliably and adequately with the finely filtered lubricating oil. Under these operating conditions, there is consequently virtually no overflow of lubricating oil from the inner space 15 into the outer space 16 via the bypass openings 14.

Under extreme operating conditions, for example at a lubricating oil temperature of −30° C., the fine-mesh pipe filter element 7 may be clogged, for example due to icing, and in this case the bypass openings 14 ensure that, even under these conditions, lubricating oil, though not filtered, can however pass in an adequate amount from the inner space 15 into the outer space 16 and via the branch 5 to the unit to be supplied. Such a unit, as for example in the case of fully variable camshaft timing (VCT), must as an absolute necessity be capable of functioning when the internal combustion engine is operating, and the bypass openings 14 mentioned ensure that this is so even in extreme situations.

The clogging of the filter element by dirt particles is prevented by a self-cleaning effect, which is brought about by the purging process by means of the high volumetric flow of oil in the axial direction of the filter.

Since the operating conditions under which the fine-mesh pipe filter element 7 would clog owing to extremely low operating temperatures are very rare, it may be assumed that a lubricating oil overflow via the bypass openings 14 scarcely ever occurs during the entire service life of the internal combustion engine, so that such a phase adjusting device for a camshaft, which under some circumstances is very sensitive to dirt particles, would scarcely ever be supplied with unfiltered lubricating oil.

Although the preferred embodiments of the present invention have been described, various changes and modifications to the design may be made by one skilled in the art without departing from the scope and spirit of the present invention as defined by the appended claims.

What is claimed is:

1. A rod-shaped pipe filter for use in a fluid line having an internal wall, the pipe filter comprising a fine-mesh pipe filter element, the fluid flowing through the filter from an inside portion to an outside portion, the pipe filter providing a bypass function when the filter element is clogged;

the pipe filter being inserted into the fluid line in sealing engagement with the fluid line at an inlet end of the pipe filter;

the fine-mesh pipe filter element having reinforcing ribs with lug-shaped spacers, the spacers holding the fine-mesh pipe filter element at a distance from the wall of the fluid line; and the pipe filter having an outlet end with a tapered surface and bypass openings arranged adjacent the outlet end, the bypass openings permitting an overflow of unfiltered fluid from the inner region to the outer region when the pipe filter element is clogged.

2. A filter according to claim 1, wherein the sealing engagement between the pipe filter and the fluid line comprises a peripheral sealing lip provided at the inlet end of the filter.

3. A filter according to claim 1, wherein the ribs are integrally molded from plastic.

4. A filter for use in a fluid line having an internal wall, the filter comprising:

a rod-shaped pipe filter having an inlet end and an outlet end, the pipe filter having a fine-mesh pipe filter element, the pipe filter being inserted into the fluid line in sealing engagement with the fluid line at an inlet end of the pipe filter;

a plurality of reinforcing ribs with lug-shaped spacers provided on the fine-mesh pipe filter element, the spacers holding the fine-mesh pipe filter element at a predetermined distance from the wall of the fluid line; and a plurality of bypass openings formed on the rod-shaped pipe filter arranged adjacent the outlet end of the rod-shaped pipe filter, the bypass openings permitting an overflow of unfiltered fluid from the inner region to the outer region when the pipe filter element is clogged.

5. A filter according to claim 4, wherein the fine mesh filter element comprises an inside portion and an outside portion and fluid flows from the inside portion across the mesh to the outside portion.

6. A filter according to claim 4, wherein the sealing engagement between the pipe filter and the fluid line comprises a peripheral sealing lip provided at the inlet end of the filter.

7. A filter according to claim 4, wherein the ribs are integrally molded from plastic.

\* \* \* \* \*